United States Patent
Saing

(10) Patent No.: US 11,091,080 B1
(45) Date of Patent: Aug. 17, 2021

(54) CARGO BED CONVEYOR ASSEMBLY

(71) Applicant: Jeffrey Saing, Louisville, KY (US)

(72) Inventor: Jeffrey Saing, Louisville, KY (US)

( * ) Notice: Subject to any disclaimer, the term of this patent is extended or adjusted under 35 U.S.C. 154(b) by 0 days.

(21) Appl. No.: 17/009,084

(22) Filed: Sep. 1, 2020

(51) Int. Cl.
*B60P 1/38* (2006.01)

(52) U.S. Cl.
CPC ..................... *B60P 1/38* (2013.01)

(58) Field of Classification Search
CPC ............................................. B60P 1/38
USPC ........................................... 414/503
See application file for complete search history.

(56) References Cited

U.S. PATENT DOCUMENTS

| | | | | |
|---|---|---|---|---|
| 1,444,604 A * | 2/1923 | Haney | ............... | B60P 1/38 414/505 |
| 3,159,296 A * | 12/1964 | Schuitemaker | ......... | B60P 1/38 414/502 |
| 3,317,066 A | 5/1967 | Hamm | | |
| 3,575,309 A * | 4/1971 | Peterson | ............... | B60P 1/4421 414/503 |
| 3,704,798 A | 12/1972 | Carpenture, Jr. | | |
| 4,101,081 A * | 7/1978 | Ritter | ............... | A01D 90/083 241/101.74 |
| 4,629,390 A | 12/1986 | Burke | | |
| 5,096,362 A | 3/1992 | Best | | |
| 5,340,266 A | 8/1994 | Hodgetts | | |
| 6,659,524 B1 * | 12/2003 | Carlson | ............... | B60P 1/003 296/26.09 |
| 6,682,291 B2 * | 1/2004 | Schatzler | ............... | B60P 1/003 296/69 |
| 9,950,868 B1 * | 4/2018 | Baek | ............... | B65G 21/10 |
| 2005/0226706 A1 * | 10/2005 | Thomas | ............... | B60P 1/38 414/467 |

* cited by examiner

*Primary Examiner* — Jonathan Snelting

(57) ABSTRACT

A cargo bed conveyor assembly for loading and unloading cargo from a truck includes a first conveyor unit that is positioned in a bed of a truck. The first conveyor unit is actuatable to rotate in a first direction to transport the cargo to a rear of the bed for removal. A second conveyor unit is slidably positioned beneath the first conveyor unit. The second conveyor unit is actuatable to rotate in a primary direction to transport the cargo from first conveyor belt to an end of a tailgate on the bed. A control is coupled to the bed of the truck and the control is in communication with each of the first conveyor unit and the second conveyor unit. The control actuates each of the first conveyor unit and the second conveyor unit to rotate in the first direction or the second direction.

11 Claims, 4 Drawing Sheets

CARGO BED CONVEYOR ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to conveyor devices and more particularly pertains to a new conveyor device for loading and unloading cargo from a truck.

(2) Description of Related Art Including Information Disclosed Under 37 CFR 1.97 and 1.98

The prior art relates to conveyor devices including a conveyor belt that is integrated into the floor of a trailer for moving cargo in the trailer. The prior art also discloses a conveyor belt that is positioned on the floor of a trailer and which as a drive unit mounted outside of the trailer for moving cargo in the trailer. The prior art discloses a conveyor belt that extends along a full length of a bed in a truck and a tailgate on the bed for moving cargo in the bed. Additionally, the prior art discloses a ramp that is pivotally coupled to a truck for loading and unloading cargo.

BRIEF SUMMARY OF THE INVENTION

An embodiment of the disclosure meets the needs presented above by generally comprising a first conveyor unit that is positioned in a bed of a truck. The first conveyor unit is actuatable to rotate in a first direction to transport the cargo to a rear of the bed for removal. A second conveyor unit is slidably positioned beneath the first conveyor unit. The second conveyor unit is actuatable to rotate in a primary direction to transport the cargo from first conveyor belt to an end of a tailgate on the bed. A control is coupled to the bed of the truck and the control is in communication with each of the first conveyor unit and the second conveyor unit. The control actuates each of the first conveyor unit and the second conveyor unit to rotate in the first direction or the second direction.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
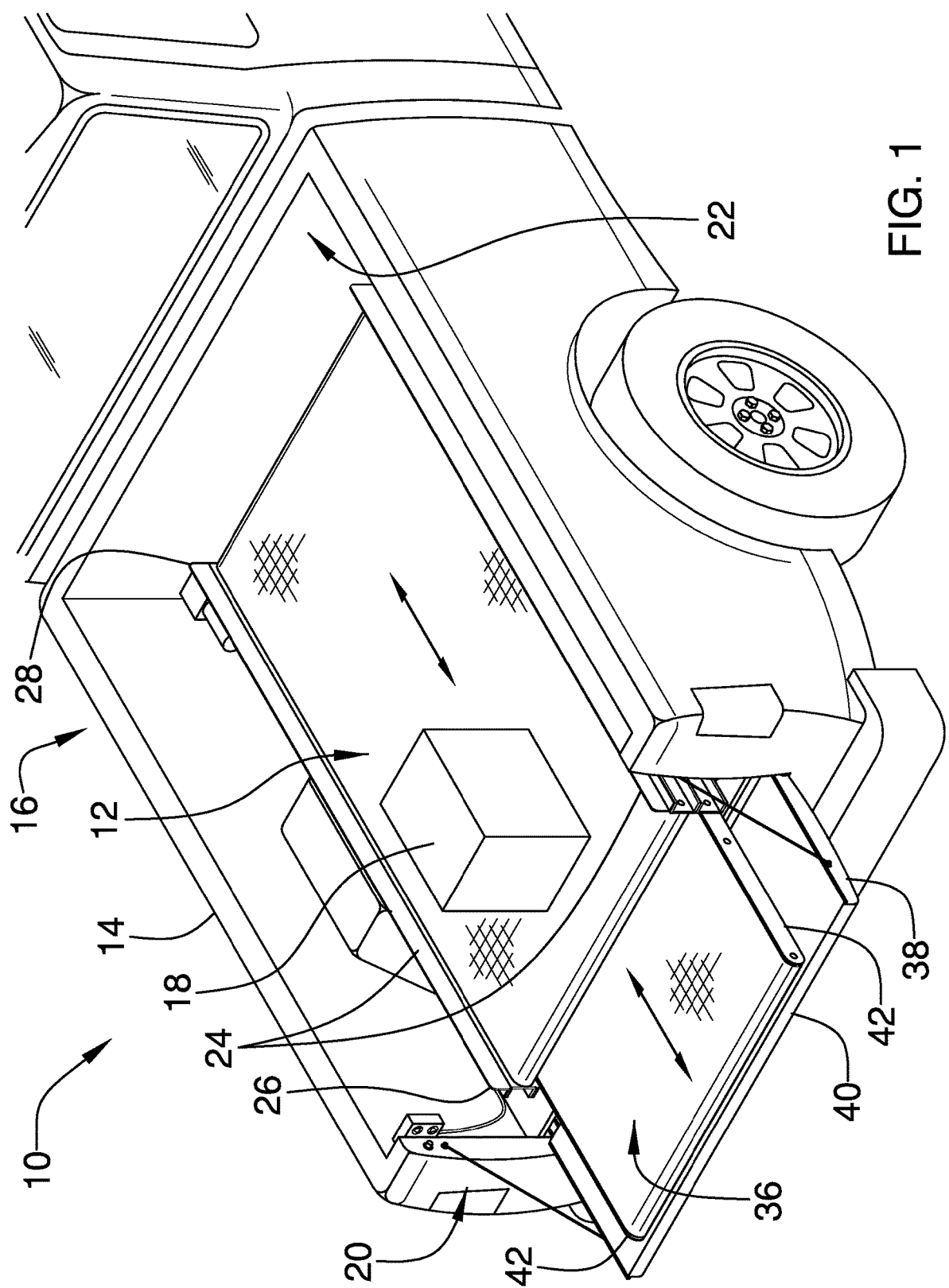
FIG. 1 is a top perspective view of a cargo bed conveyor assembly according to an embodiment of the disclosure.
Figure 2:
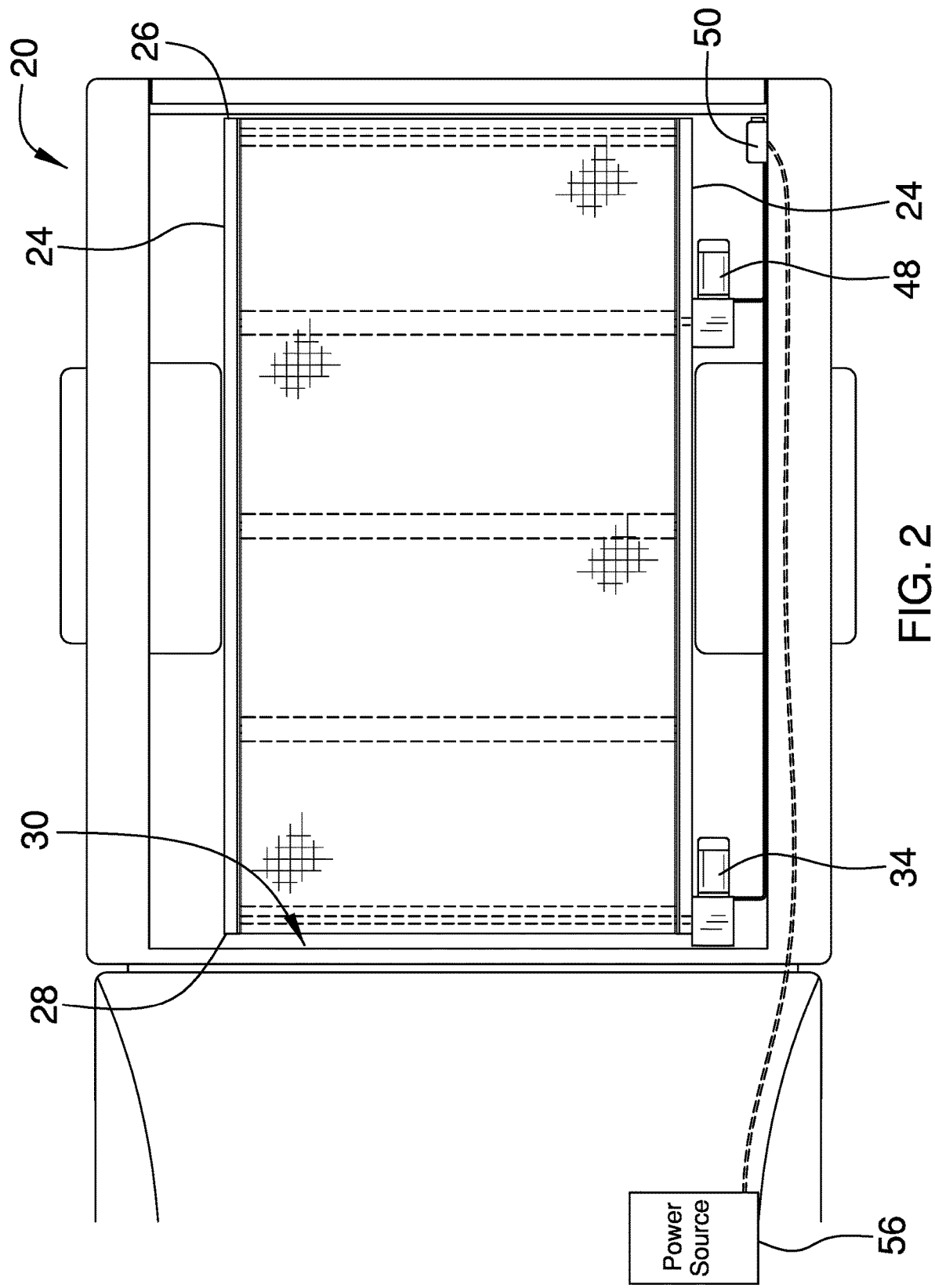
FIG. 2 is a top phantom view of an embodiment of the disclosure.
Figure 3:
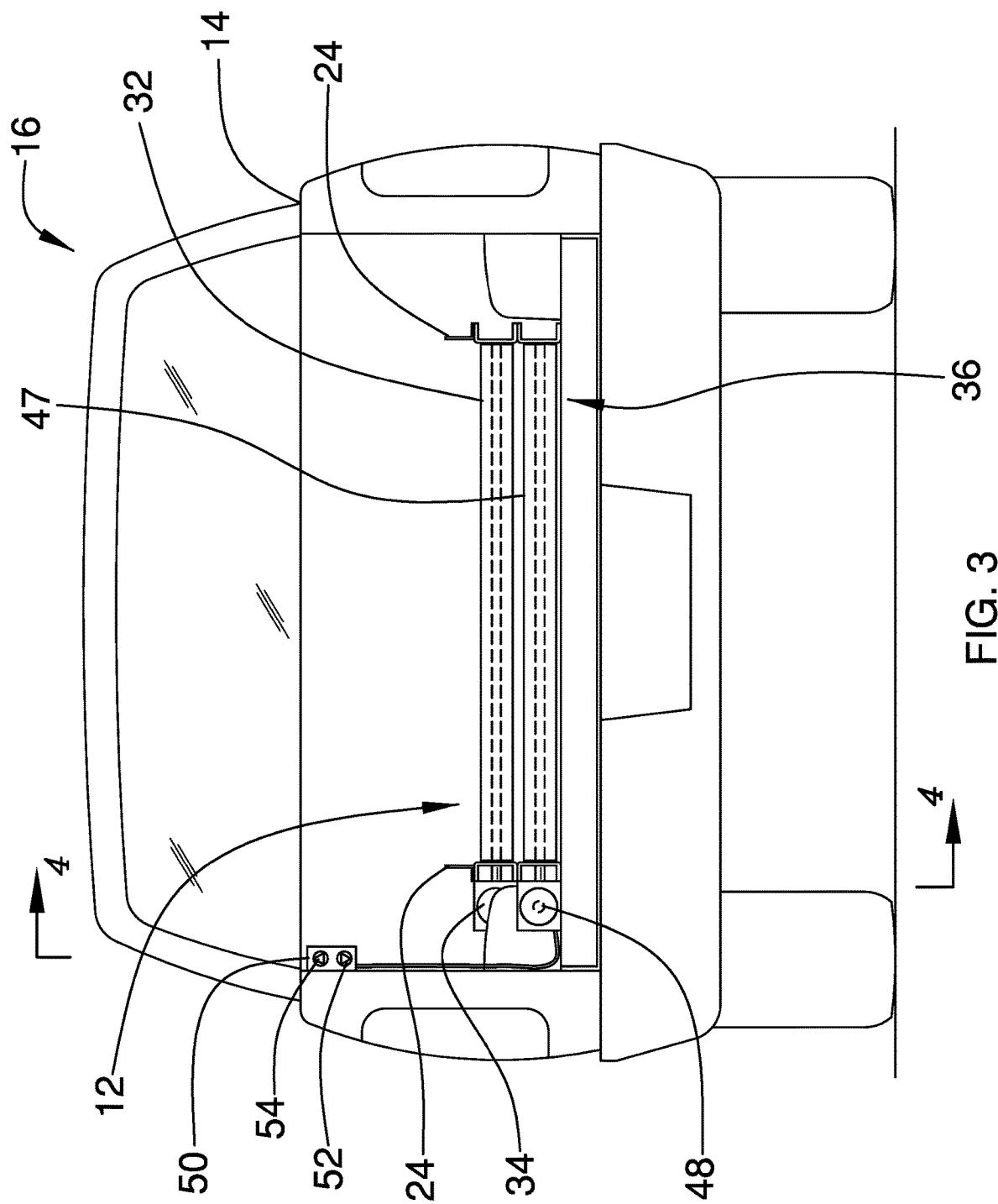
FIG. 3 is a back phantom view of an embodiment of the disclosure.
Figure 4:
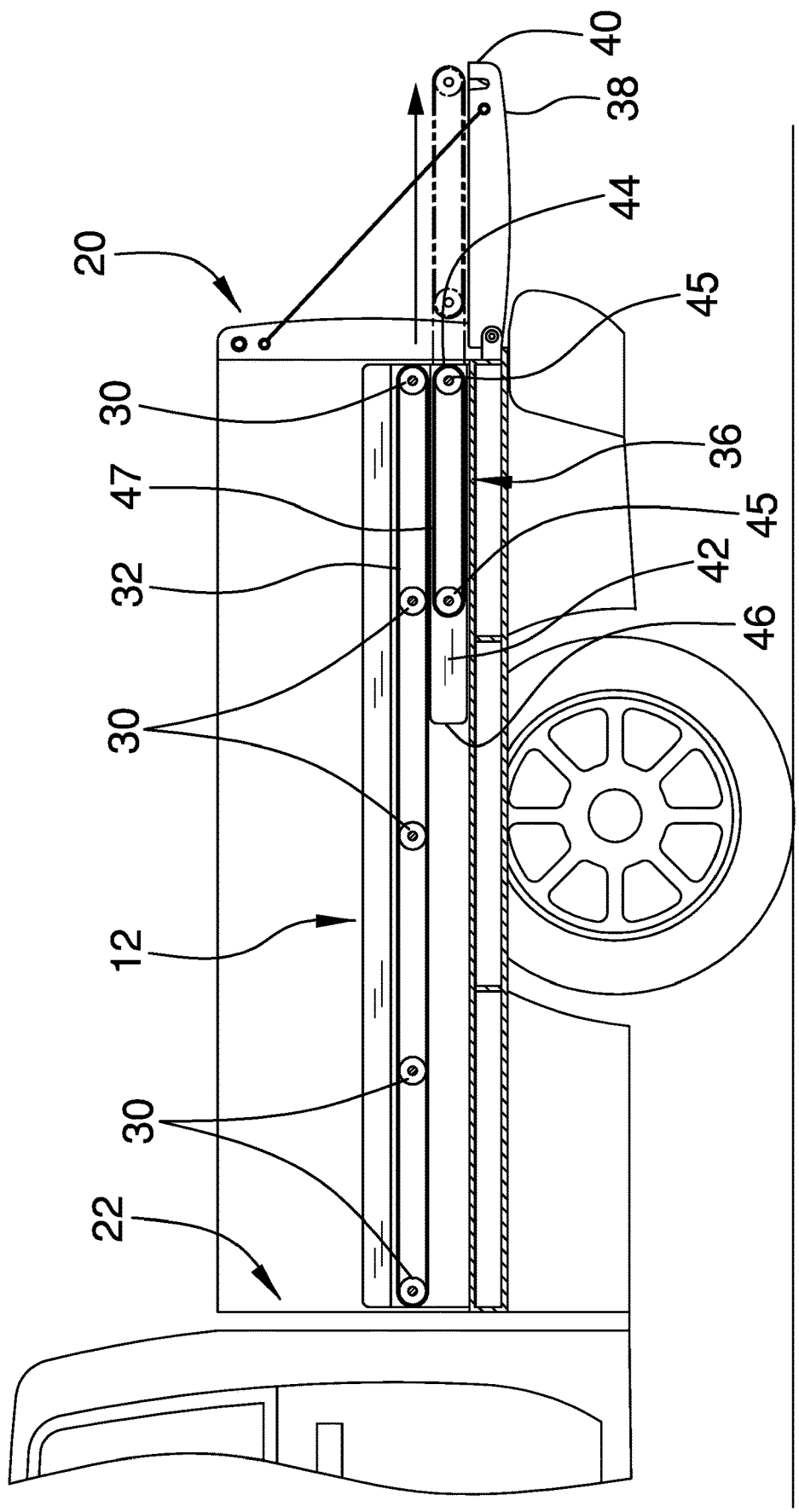
FIG. 4 is a cross sectional view taken along line 4-4 of FIG. 3 of an embodiment of the disclosure.

With reference now to the drawings, and in particular to FIGS. 1 through 4 thereof, a new conveyor device embodying the principles and concepts of an embodiment of the disclosure and generally designated by the reference numeral 10 will be described.

As best illustrated in FIGS. 1 through 4, the cargo bed conveyor assembly 10 generally comprises a first conveyor unit 12 is positioned in a bed 14 of a truck 16 and cargo 18 can be stacked on the first conveyor unit 12. The truck 16 may be a pickup truck, an over the road cargo truck or any other type of vehicle with a flat bed. The first conveyor unit 12 is actuatable to rotate in a first direction to transport the cargo 18 to a rear 20 of the bed 14 for removal. In this way a user does not have to climb into the bed 14 to retrieve cargo 18 at the rear 20 of the bed 14. Additionally, the first conveyor unit 12 is actuatable to rotate in a second direction to transport the cargo 18 to a front 22 of the bed 14 for transportation in the bed 14.

The first conveyor unit 12 comprises a set of first rails 24 that each has a first end 26 and a second end 28. Each of the first rails 24 is positioned in the bed 14 of the truck 16 having each of the first rails 24 extending between the front 22 and the rear 20 of the bed 14. Additionally, the first rails 24 are spaced apart from each other. A plurality of first rollers 30 is provided and each of the first rollers 30 is rotatably coupled between the first rails 24. The first rollers 30 are spaced apart from each other and are distributed between the first end 26 and the second end 28 of the first rails 24.

The first conveyor unit 12 includes a first conveyor belt 32 that extends around the plurality of first rollers 30 for having the cargo 18 placed thereon. The first conveyor unit 12 includes a first motor 34 that is coupled to a respective one of the first rollers 30. The first motor 34 rotates in a first direction or a second direction when the first motor 34 is turned on. Additionally, the first motor 34 may comprise an electric motor or the like. The first conveyor belt 32 travels toward the rear 20 of the bed 14 when the first motor 34 rotates in the first direction. In this way the cargo 18 is automatically transported to the rear 20 of the bed 14 for unloading. The first conveyor belt 32 travels toward the front 22 of the bed 14 when the first motor 34 rotates in the second direction. In this way the cargo 18 is automatically transported to the front 22 of the bed 14 for transporting the cargo 18 in the bed 14 of the truck 16.

A second conveyor unit 36 is provided and the second conveyor unit 36 is slidably positioned beneath the first conveyor unit 12. The second conveyor unit 36 is positionable in a deployed position having the second conveyor unit 36 extending over a tailgate 38 on the bed 14 of the truck 16. In this way the second conveyor unit 36 can transport the cargo 18 to the end 40 of the tailgate 38 for unloading. In the event that a tailgate 38 is not present, the second conveyor unit 36 can be angled downwardly toward the ground to define a ramp on which the cargo 18 can be transported into the bed 14 when the cargo 18 is too heavy for the user to lift. The second conveyor unit 36 is actuatable to rotate in a primary direction to transport the cargo 18 from first conveyor belt 32 to the end of the tailgate 38. Conversely, the second conveyor unit 36 is actuatable to rotate in a secondary direction to transport the cargo 18 from the end of the tailgate 38 to the first conveyor unit 12.

The second conveyor unit 36 comprises a set of second rails 42 that each has a first end 44 and a second end 46. Each of the second rails 42 is positioned in the bed 14 of the truck 16 having each of the second rails 42 extending between the front 22 and the rear 20 of the bed 14. Additionally, the second rails 42 are spaced apart from each other. Each of the second rails 42 has a length that is substantially less than the length of the first rails 24.

The second conveyor unit 36 includes a plurality of second rollers 45 that is each rotatably coupled between the second rails 42. The second rollers 45 are spaced apart from each other and are distributed between the first end 44 and the second end 46 of the second rails 42. The second conveyor unit 36 includes a second conveyor belt 47 that extends around the plurality of second rollers 45 for having the cargo 18 placed thereon. The second conveyor unit 36 includes a second motor 48 that is coupled to a respective one of the second rollers 45. The second motor 48 rotates in a second direction or a second direction when the second motor 48 is turned on. Additionally, the second motor 48 may comprise an electric motor or the like.

The second conveyor belt 47 travels toward the end of the tailgate 38 when the second motor 48 rotates in the second direction. In this way the second conveyor belt 47 can transport the cargo 18 to the end of the tailgate 38 for unloading. The second conveyor belt 47 travels toward the front 22 of the first conveyor belt 32 when the second motor 48 rotates in the second direction to transport the cargo 18 to the first conveyor belt 32. In this way the second conveyor belt 47 can transport the cargo 18 onto the first conveyor belt 32 without requiring the user to lift the cargo 18 onto the first conveyor belt 32.

A control 50 is coupled to the bed 14 of the truck 16 such that the control 50 is accessible to a user. The control 50 is in communication with each of the first conveyor unit 12 and the second conveyor unit 36. Additionally, the control 50 actuates each of the first conveyor unit 12 and the second conveyor unit 36 to rotate in the first direction or the second direction. The control 50 includes a first button 52 and a second button 54, and each of the first button 52 and the second button 54 is electrically coupled to each of the first motor 34 and the second motor 48. Each of the first motor 34 and the second motor 48 rotates in the first direction when the first button 52 is depressed. Conversely, each of the first motor 34 and the second motor 48 rotates in the second direction when the second button 54 is depressed. The control 50 is electrically coupled to a power source 56 comprising an electrical system of the truck 16.

In use, the cargo 18 is placed on the first conveyor unit 12 and the second button 54 is depressed to transport the cargo 18 to the front 22 of the bed 14. In this way the cargo 18 can be automatically loaded into the bed 14 for transport. The first button 52 is depressed to transport the cargo 18 to the rear 20 of the bed 14 for unloading. In this way the user does not have to climb into the bed 14 of the truck 16 to unload the cargo 18. The second conveyor unit 36 can be deployed to extend over the tailgate 38 or the second conveyor unit 36 can be angled downwardly to form a ramp extending between the bed 14 and the ground. In this way the cargo 18 can be loaded into the bed 14 without requiring the user to lift the cargo 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cargo bed conveyor assembly for assisting a user with unloading cargo from a truck bed, said assembly comprising:

a first conveyor unit being positioned in a bed of a truck wherein said first conveyor unit is configured to have cargo stacked thereon, said first conveyor unit being actuatable to rotate in a first direction wherein said first conveyor unit is configured to transport the cargo to a rear of the bed for removal, said first conveyor unit being actuatable to rotate in a second direction wherein said first conveyor unit is configured to transport the cargo to a front of the bed for transport;

a second conveyor unit being slidably positioned beneath said first conveyor unit, said second conveyor unit being positionable in a deployed position having said second conveyor unit extending over a tailgate on the bed of the truck wherein said second conveyor unit is configured to transport the cargo to an end of the tailgate for unloading, said second conveyor unit being actuatable to rotate in a primary direction wherein said second conveyor unit is configured to transport the cargo from first conveyor belt to the end of the tailgate, said second conveyor unit being actuatable to rotate in a secondary direction wherein said second conveyor unit is configured to transport the cargo from the end of the tailgate to said first conveyor unit; and a control being coupled to the bed of the truck wherein said control is configured to be accessible to a user, said control being in communication with each of said first conveyor unit and said second conveyor unit, said control actuating each of said first conveyor unit and said second conveyor unit to rotate in said first direction or said second direction.

2. The assembly according to claim 1, wherein said first conveyor unit comprises a set of first rails, each of said first rails having a first end and a second end, each of said first rails being positioned in the bed of the truck having each of said first rails extending between the front and the rear of the bed, said first rails being spaced apart from each other.

3. The assembly according to claim 2, wherein said first conveyor unit includes a plurality of first rollers, each of said first rollers being rotatably coupled between said first rails, said first rollers being spaced apart from each other and being distributed between said first end and said second end of said first rails.

4. The assembly according to claim 3, wherein said first conveyor unit comprises a first conveyor belt extending around said plurality of first rollers wherein said first conveyor belt is configured to have the cargo placed thereon.

5. The assembly according to claim 4, wherein said first conveyor unit comprises a first motor being coupled to a respective one of said first rollers, said first motor rotating in a first direction or a second direction when said first motor is turned on, said first conveyor belt travelling toward the rear of the bed when said first motor rotates in said first direction wherein said first conveyor belt is configured to transport the cargo to the rear of the bed for unloading, said first conveyor belt travelling toward the front of the bed when said first motor rotates in said second direction wherein said first conveyor belt is configured to transport the cargo to the front of the bed for transporting the cargo.

6. The assembly according to claim 1, wherein:
said first conveyor unit includes a set of first rails; and
said second conveyor unit comprises a set of second rails, each of said second rails having a first end and a second end, each of said second rails being positioned in the bed of the truck having each of said second rails extending between the front and the rear of the bed, said second rails being spaced apart from each other.

7. The assembly according to claim 6, wherein:
said first conveyor unit includes a plurality of first rollers; and
said second conveyor unit includes a plurality of second rollers, each of said second rollers being rotatably coupled between said second rails, said second rollers being spaced apart from each other and being distributed between said first end and said second end of said second rails.

8. The assembly according to claim 7, wherein:
said first conveyor unit includes a first conveyor belt; and
said second conveyor unit includes a second conveyor belt extending around said plurality of second rollers wherein said second conveyor belt is configured to have the cargo placed thereon.

9. The assembly according to claim 8, wherein:
said first conveyor unit includes a first motor; and said second conveyor unit includes a second motor being coupled to a respective one of said second rollers, said second motor rotating in a first direction or a second direction when said second motor is turned on, said second conveyor belt travelling toward the end of the tailgate when said second motor rotates in said first direction wherein said second conveyor belt is configured to transport the cargo to the end of the tailgate for unloading, said second conveyor belt travelling toward the front of said first conveyor belt when said second motor rotates in said second direction wherein said second conveyor belt is configured to transport the cargo to said first conveyor belt.

10. The assembly according to claim 1, wherein:
said first conveyor unit includes a first motor;
said second conveyor unit includes a second motor; and
said control includes a first button and a second button, each of said first button and said second button being electrically coupled to each of said first motor and said second motor, each of said first motor and said second motor rotating in a first direction when said first button is depressed, each of said first motor and said second motor rotating in a second direction when said second button is depressed, said control being electrically coupled to a power source comprising an electrical system of the truck.

11. A cargo bed conveyor assembly for assisting a user with unloading cargo from a truck bed, said assembly comprising:

a first conveyor unit being positioned in a bed of a truck wherein said first conveyor unit is configured to have cargo stacked thereon, said first conveyor unit being actuatable to rotate in a first direction wherein said first conveyor unit is configured to transport the cargo to a rear of the bed for removal, said first conveyor unit being actuatable to rotate in a second direction wherein said first conveyor unit is configured to transport the cargo to a front of the bed for transport, said first conveyor unit comprising:

a set of first rails, each of said first rails having a first end and a second end, each of said first rails being positioned in the bed of the truck having each of said first rails extending between the front and the rear of the bed, said first rails being spaced apart from each other;

a plurality of first rollers, each of said first rollers being rotatably coupled between said first rails, said first rollers being spaced apart from each other and being distributed between said first end and said second end of said first rails;

a first conveyor belt extending around said plurality of first rollers wherein said first conveyor belt is configured to have the cargo placed thereon; and a first motor being coupled to a respective one of said first rollers, said first motor rotating in a first direction or a second direction when said first motor is turned on, said first conveyor belt travelling toward the rear of the bed when said first motor rotates in said first direction wherein said first conveyor belt is configured to transport the cargo to the rear of the bed for unloading, said first conveyor belt travelling toward the front of the bed when said first motor rotates in said second direction wherein said first conveyor belt is configured to transport the cargo to the front of the bed for transporting the cargo;

a second conveyor unit being slidably positioned beneath said first conveyor unit, said second conveyor unit being positionable in a deployed position having said second conveyor unit extending over a tailgate on the bed of the truck wherein said second conveyor unit is configured to transport the cargo to an end of the tailgate for unloading, said second conveyor unit being actuatable to rotate in a primary direction wherein said second conveyor unit is configured to transport the cargo from first conveyor belt to the end of the tailgate, said second conveyor unit being actuatable to rotate in a secondary direction wherein said second conveyor unit is configured to transport the cargo from the end of the tailgate to said first conveyor unit, said second conveyor unit comprising:

a set of second rails, each of said second rails having a first end and a second end, each of said second rails being positioned in the bed of the truck having each of said second rails extending between the front and the rear of the bed, said second rails being spaced apart from each other;

a plurality of second rollers, each of said second rollers being rotatably coupled between said second rails, said second rollers being spaced apart from each other and being distributed between said first end and said second end of said second rails;

a second conveyor belt extending around said plurality of second rollers wherein said second conveyor belt is configured to have the cargo placed thereon; and a second motor being coupled to a respective one of said second rollers, said second motor rotating in a first direction or a second direction when said second motor is turned on, said second conveyor belt travelling toward the end of the tailgate when said second motor rotates in said first direction wherein said second conveyor belt is configured to transport the cargo to the end of the tailgate for unloading, said second conveyor belt travelling toward the front of said first conveyor belt when said second motor rotates in said second direction wherein said second conveyor belt is configured to transport the cargo to said first conveyor belt; and a control being coupled to the bed of the truck wherein said control is configured to be accessible to a user, said control being in communication with each of said first conveyor unit and said second conveyor unit, said control actuating each of said first conveyor unit and said second conveyor unit to rotate in said first direction or said second direction, said control including a first button and a second button, each of said first button and said second button being electrically coupled to each of said first motor and said second motor, each of said first motor and said second motor rotating in said first direction when said first button is depressed, each of said first motor and said second motor rotating in said second direction when said second button is depressed, said control being electrically coupled to a power source comprising an electrical system of the truck.

* * * * *